Oct. 11, 1960 E. GOTT 2,956,178
GENERATION OF A PULSE COMPLEX
Filed Oct. 15, 1957 2 Sheets-Sheet 1

INVENTOR.
EUYEN GOTT
BY Wade Koontz and
Martin J. Finnegan
ATTORNEYS

INVENTOR.
EUYEN GOTT
BY Wade Koontz and Martin J. Finnegan
ATTORNEYS 2,956,178

GENERATION OF A PULSE COMPLEX

Euyen Gott, Baltimore, Md., assignor to the United States of America as represented by the Secretary of the Air Force Filed Oct. 15, 1957, Ser. No. 690,411

2 Claims. (Cl. 307—88.5)

This invention relates to the generation of electrical pulses, and particularly to the generation of pulse patterns of some complexity, in contrast to pulse patterns that are composed of pulses of uniform amplitude, duration, and repetition rate.

For many computation situations it is desirable to have an electrical control method that can adapt itself to the processing of numerical values responding to the law of geometric progression. The present invention provides such a control method, as well as novel means for incorporating such a control method into electrical apparatus capable of performing in accordance with the pattern of operation to which the control method is addressed.

More specifically, the invention involves the production of electrical pulses of geometrically increasing amplitude, with successive pulses spaced at geometrically increasing intervals, such pulse pattern being achieved by novel methods and means of utilizing the capability of multi-zoned or junctioned transistors to respond in a progressively varying fashion to separate voltage inputs directed to two of its electrodes, whereby the output at a third electrode is a series of pulses of progressively increasing amplitude.

Such a pulse output can be applied to many computation and control functions, such as time quantization and voltage quantization in analog computers, or to the control of the percentage of error in measuring or computing operations. Again, the invention may be used as a logarithmic function generator in computing and servo mechanism, or as a circuit for finding or checking the solutions of multiplication, squaring, or other exponential problems.

Other characteristics and potentialities of the invention will be apparent as the following description is read in conjunction with the accompanying drawings wherein.

Figure 1:
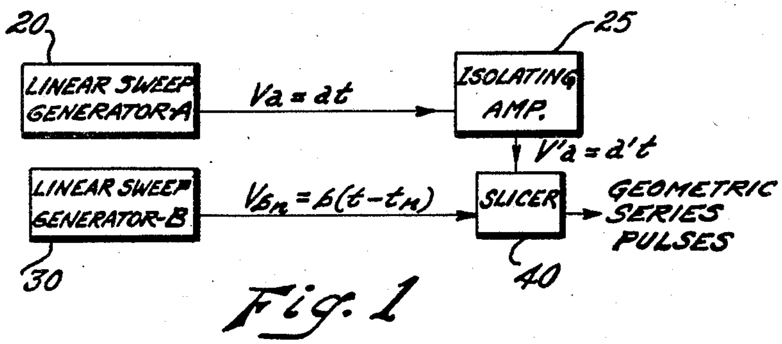
Fig. 1 is a block diagram of electronic components entering into an embodiment of the invention.
Figure 3:
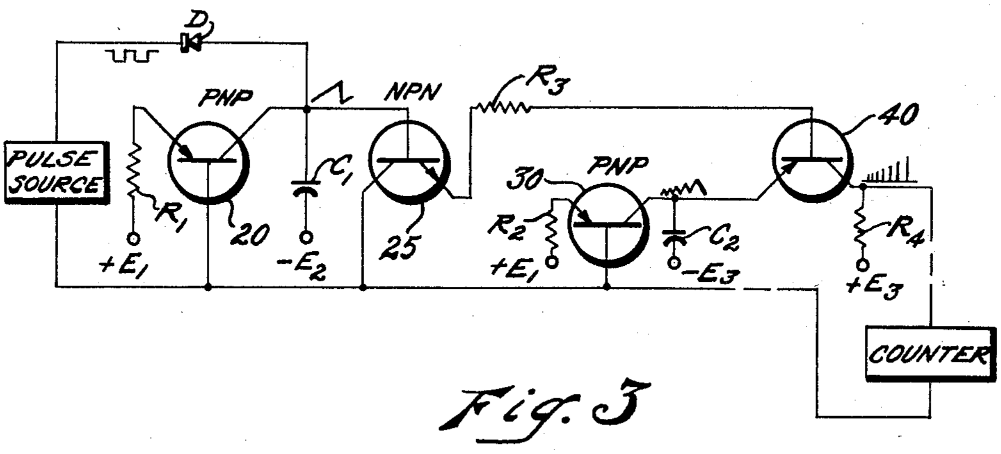
Fig. 3 is a more complete diagram of circuit details for the embodiment of Fig. 1.

Referring first to Figs. 1 and 3, the invention may be embodied in circuitry including an N type transistor 40 functioning as a "slicer," or comparator, receiving the differing voltage outputs of a pair of linear sweep generators A and B, each embodying a PNP type of transistor (as shown at 20 and 30, respectively, in Fig. 3) and a condenser, the condenser associated with transistor 20 being shown at $C_1$ in Fig. 3, and the condenser associated with transistor 30 at $C_2$ in Fig. 3.

Generator A (Fig. 1) produces a voltage $$V_a = at \qquad (1)$$

and generator B produces another voltage $$V_{b_n} = b(t - t_n) \qquad (2)$$

where $a$ and $b$ are both positive constants. The constants satisfy the condition $$a << b$$

The ending time of the $(n-1)$th pulse is $t_n$.

Generator A drives an isolating amplifier 25 which has a current gain of the order of 100, but a voltage gain slightly less than one. Let this voltage gain be $a'/a$, then the output voltage of the isolating amplifier is $$V_a' = a't \qquad (3)$$

The slicer is constantly comparing the two voltages $V_a'$ and $V_{b_n}$. As soon as $V_{b_n}$ is a trifle higher than $V_a'$, the slicer triggers and $V_{b_n}$ instantly becomes $$V_{b_{n+1}} = (b - b')(t - t_{n+1}) \qquad (4)$$

where $b'$ is also a positive constant, and $$b << b'$$

At the moment when $V_{b_n}$ equals $V_{b_{n+1}}$, $(t = t_n')$ the slicer produces a pulse which lasts until $t = t_{n+1}$ (the $n$th pulse). At this time the slicer stops conducting, and the output of generator B once again begins to rise with the following relation $$V_{b_{n+1}} = b(t - t_{n+1}) \qquad (5)$$

While the slicer and generator B go through these changes, the sweep generated by generator A progresses without being disturbed.

Figure 2:
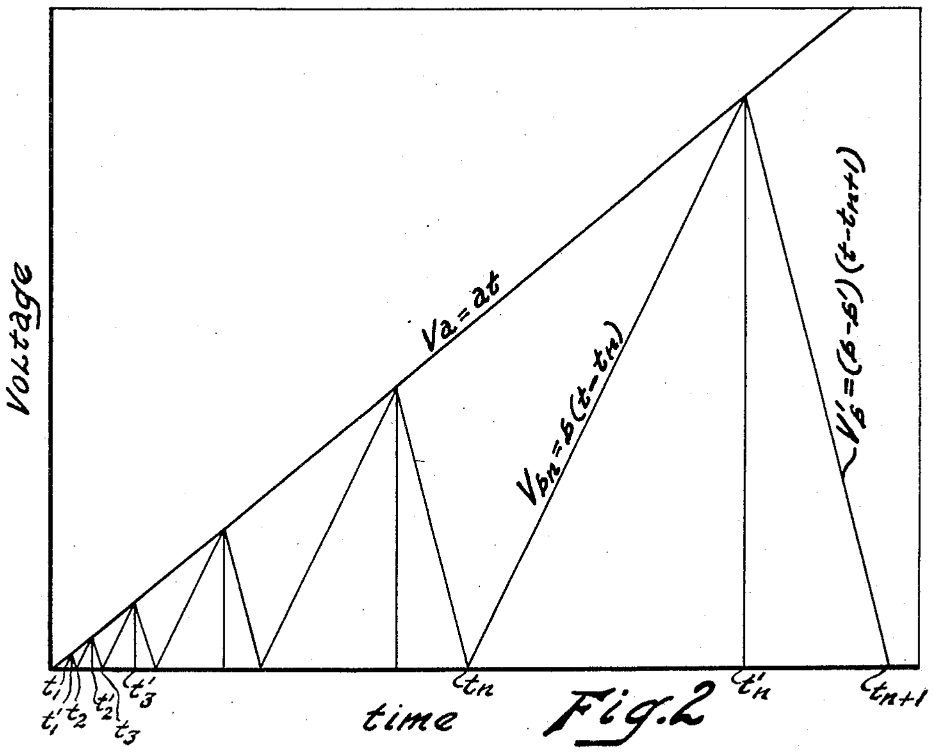
Fig. 2 is a graphic diagram of time-voltage relationships obtaining in the pulse generating process.

As can be seen from Fig. 2, at time $t = t_n'$, there is obtained $$V_a = V_{b_n} = V_{b'_{n+1}} \qquad (6)$$

or $$a't_n' = b(t_n' - t_n) = (b - b')(t_n' - t_{n+1}) \qquad (7)$$

Solving for $t_{n+1}$ in terms of $t_n$, we find $$t_{n+1} = \frac{b(b - b' - a')}{(b - b')(b - a')} t_n$$

or $$\frac{t_{n+1}}{t_n} = \text{Constant}$$

Hence, a geometric series of pulses is obtained as long as the two generators produce voltages which vary linearly with time.

From Fig. 2 it can also be seen that both the amplitude and the duration of successive pulses form geometric progressions.

Fig. 3 is a schematic diagram of the transistor geometric series pulse generator. The two PNP transistors produce substantially constant currents to charge the respective condensers as long as the voltage across the condenser is less than the supply voltage in the respective collector circuits. The outputs are two voltages which increase linearly with time.

The NPN transistor 25, grounded-collector amplifier unit, offers very high input impedance and very low output impedance. It must, however, be driven by a low impedance source and must work into a high impedance load. Both conditions are satisfied here. Thus this amplifier provides adequate isolation between the linear sweep generator A and the slicer, without sacrificing any appreciable voltage delivered by generator A.

The slicer is an ordinary emitter-input negative-resistance multivibrator with the exception that it has a linearly increasing bias at the base provided by the isolating amplifier. This increasing bias makes it necessary for generator B to climb to higher and higher voltages each time after it is discharged by the trigger action of the slicer.

Figure 4A:
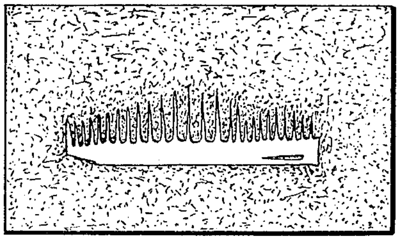
Fig. 4 shows a series of pulse patterns (A, B, and C) that are obtained at indicated stages of the operation.
Figure 4B:
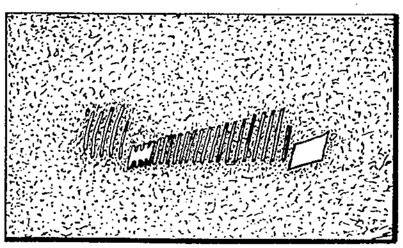
Figure 4C:
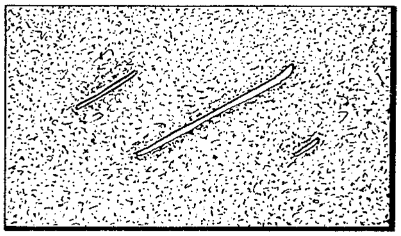

The geometric series produced at the output of the slicer is shown in Fig. 4A. Figs. 4B and 4C show the linear sweeps produced by generator A and B, respectively. The period of the sweep of generator A can be controlled externally with negative pulses. These are fed into a condenser through a crystal diode. It can also be controlled internally with another multivibrator which discharges condenser C1 of Fig. 3 periodically.

The linearity of the two sweeps from generators A and B depends upon the complexity of the circuit. Complicating integrating circuits may be used instead of the simple one-transistor circuit to produce highly accurate linear sweeps.

In analog computers or automatic control devices, the geometric series pulse generator may be used for time quantization and voltage quantization so that the percentage error of measurement may be controlled and maintained at a constant level for the whole range of measurement. The geometric series pulse generator may also be used as a logarithmic function generator when it is in control of a linear step voltage generator, and also for finding the result of multiplication, squaring or taking the *n*th power of a number.

What is claimed is:

1. A pulse generating system comprising, in combination, a signal translating device having at least two input electrodes and one output electrode, means including a pair of linear sweep generators for feeding energy into each of said two input electrodes in the form of electrical pulses occurring at successive time intervals whose spacing conforms to the law of geometric progression, and at feeding rates which bear a pre-selected ratio, one to the other, said means also including an isolating amplifier for applying a linearly increasing bias voltage to said signal translating device, to cause delivery of electrical pulses whose amplitudes and spacing vary in accordance with the magnitude of the ratio obtaining as between said two feeding rates.

2. A pulse generating system comprising, in combination, a pair of linear sweep generators having output patterns in the form of electrical pulses occurring at successive time intervals whose spacing conforms to the law of geometric progression, said pulses having correspondingly increasing magnitudes following the law of geometric progression, but at different rates and over different time cycles, means for comparing said two progressively increasing voltage output values, said means including a transistor whose emitter electrode receives the output of one of said sweep generators and whose base electrode receives the output of the other sweep generators, said transistor having its respective polar zones joined in a manner to deliver an output pulse only when one of said progressively increasing voltage output values rises to a level of equality with the other.

References Cited in the file of this patent

UNITED STATES PATENTS

| | | |
|---|---|---|
| 2,164,968 | Urtel et al. | July 4, 1939 |
| 2,207,499 | Vance | July 9, 1940 |
| 2,366,902 | Hallmark | Jan. 9, 1945 |
| 2,547,217 | Kraayeveld | Apr. 3, 1951 |
| 2,713,117 | Haegele | July 12, 1955 |